UNITED STATES PATENT OFFICE.

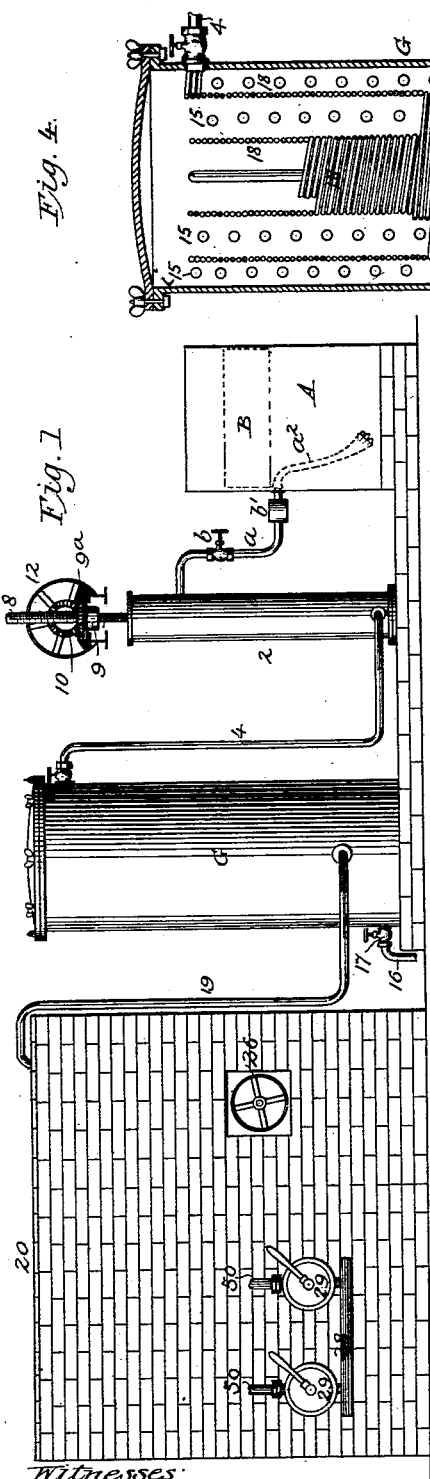

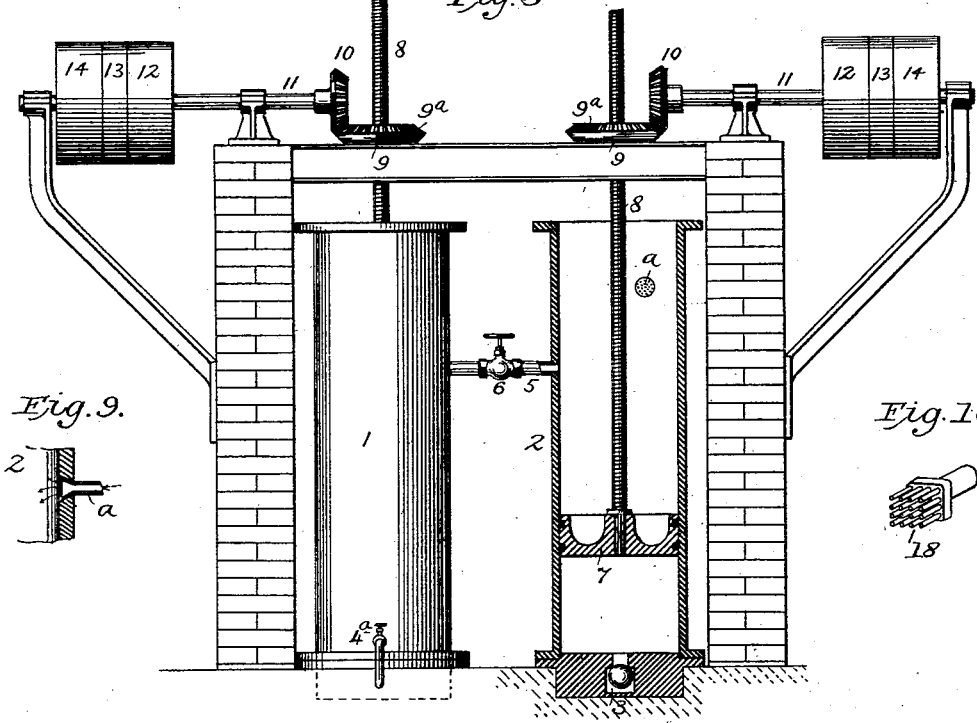
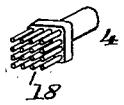
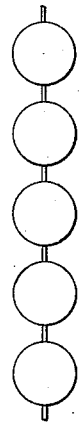
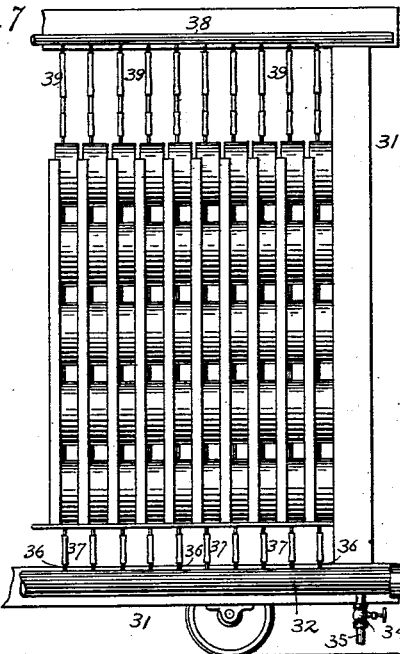
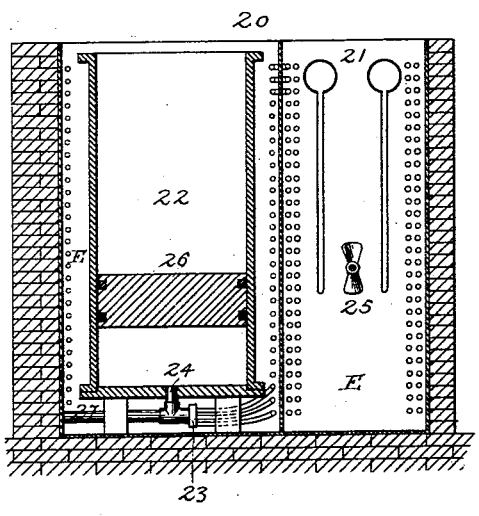

ENRIQUE TAULIS, OF SANTIAGO, CHILE.

PROCESS OF AND APPARATUS FOR STERILIZING MILK.

SPECIFICATION forming part of Letters Patent No. 564,851, dated July 28, 1896.

Application filed February 25, 1896. Serial No. 580,685. (No model.) Patented in Chile September 27, 1894.

*To all whom it may concern:*

Be it known that I, ENRIQUE TAULIS, a citizen of the Republic of Chile, residing at Santiago, Chile, have invented certain new and useful Improvements in Preserving Milk, (for which I have obtained Chilean patent, dated September 27, 1894,) of which the following is a specification.

My invention relates to preserving cow's milk in its natural state and sterilizing it without changing its organoleptic properties and without the addition of any substance or substances whatsoever.

Milk has great absorbing qualities, and as it is extracted from the cow by compressing the teat, which has several small apertures, it is discharged in the form of a thin thread, and in passing to the receptacle through the air, which is loaded with deleterious gases, &c., it necessarily absorbs a great quantity of these, for, drop by drop, the milk is saturated with them, largely on account of the thin and divided form in which it comes from the teat. To these gases are added spores and other organic and inorganic matters, as hairs, pus, dust, &c., which if not removed render the milk of such character that it is readily modified and changed by the influence of external forces.

In the practice of my invention I have succeeded in extracting and removing from the milk the air, gases, and other extraneous matter, thus rendering the milk ready to be preserved in its natural state. This I do by first passing the milk through a suitable filter, by this means depriving it of all organic and solid impurities. The milk is then drawn from the filter to a vacuum-chamber, which it enters in the form of a fine spray, permitting the deleterious gases to separate from the milk, which they will do *in vacuo* by reason of their lighter specific gravity, leaving the milk perfectly pure and free from the air, gases, and lighter spores that it contained.

The milk having been treated as above described and being now in a perfectly pure and natural state, it is necessary, to prevent the separation of the cream, to form a homogeneous liquid or stable emulsion. For this purpose it is heated to a temperature of 90° or 100° centigrade, and thereafter rapidly cooled to zero centigrade. This must be done very quickly in order to produce in the casein a molecular change that will render the milk more viscous. By this process the greasy cellules are prevented from rising, while in milk under ordinary conditions the greasy cellules, being surrounded with air and gas, are rendered light and susceptible of rising, and because of this contribute to the separation of the cream. Again, whatever pressure can be effected upon liquids is also utilized, and this is done very easily by filling the can with milk at its least volume, that is, from 2° to 3° centigrade, and after it returns to its normal temperature it will increase in volume and entirely fill the can under great pressure.

The can in which the milk is finally packed or stored is of peculiar construction in having very little height as compared with its diameter, the object of which is to diminish the force of ascension of the cream, and, besides this, should there have been such a separation and a small part of the cream had gone to the top, this would be an exceptionally thin coating, which could not be churned into butter by the shaking received from handling the cans, because of the pressure to which the milk therein is subjected. In no case can there be any material separation of the cream if the milk is well prepared and the can is well filled.

When the cans of milk are full and well soldered, the milk can be sterilized by subjecting it to a temperature of 113° centigrade for twenty minutes, or 118° for fifteen minutes, or 120° for ten minutes, without suffering any alteration in color or taste.

Having thus in a general manner described my process of preserving milk, I will now describe an apparatus that may be used therefor, reference being had to the accompanying drawings, in which—

Figure 1 is a side elevation of such an apparatus. Fig. 2 is a plan view thereof. Fig. 3 is an end elevation with one of the vacuum-chambers in section. Fig. 4 is a vertical section of the heating-cylinder or pasteurizer. Fig. 5 is a cross-section of the same on the line 5 5. Fig. 6 is a vertical longitudinal section of the refrigerating and storing apparatus. Fig. 7 is a front elevation of part of a truck, on which the cans are mounted to be filled. Fig. 8 is a side elevation of a series of cans. Figs. 9 and 10 are details, the former of the purifier-cylinder 2 and the latter of the heating-cylinder or pasteurizer.

Similar letters and numerals of reference indicate similar parts throughout the drawings.

A represents a tank made of tinned copper, having a capacity of from two thousand to three thousand liters. In the upper portion I place a charcoal filter B, on the top of which the milk is poured when brought from the cow. From the side of the tank B, below the filter, a pipe $a$ extends. To the inner end of this pipe is attached a rubber tube $a^2$, extending downwardly near the bottom of the tank A, where it is enlarged. Within this enlarged mouth sponges are packed to remove all traces of charcoal that may have been carried through the filter with the milk. The pipe $a$ extends from the tank A to the purifier.

The purifier is composed of two cylinders 1 and 2, Figs. 1, 2, and 3, made preferably of cast-iron, and lined interiorly with bronze one-fourth inch thick. The dimensions of these cylinders are substantially as follows: interior diameter 0.30 meters and height 2.20 meters. These cylinders are placed vertically, and separated a distance of 1.20 meters from center to center. The lower end of each cylinder has in its center an aperture two inches in diameter, which communicates with a valve-chamber 3, containing a ball-valve. The outlet of the valve-chamber 3 of the cylinder 2 is connected with a heating-cylinder, or what I term a "pasteurizer," Figs. 1 and 2, by a two-inch pipe 4 of tinned copper. The similar valve of the cylinder 1 communicates with a pipe $4^a$, leading to the external air for the exit of the gases. The two cylinders 1 and 2 are united by a pipe 5 two inches in interior diameter, provided centrally with a valve 6. The pipe 5 is arranged at a height of about 1.40 meters above the lower ends of the cylinders.

Within each cylinder 1, 2, is a piston 7, preferably of cast-iron with bronze packing-rings nicely adjusted to the cylinder in such a way as to be tight. The piston 7 of each cylinder is attached to a threaded rod 8, which passes through a threaded nut 9, secured to or forming a part of a beveled wheel $9^a$. Each of the wheels $9^a$ is rotated by means of a spur-pinion 10 upon the shaft 11, on which shaft 11 are three pulleys 12, 13, and 14. The pulleys 12 and 14 are loose, while the pulleys 13 are fixed to the shaft 11. The pulleys 12 carry cross-belts, and the pulleys 14 straight belts. By this arrangement I am enabled to get movement from each direction by shifting the belts from either of the loose pulleys 12 or 14 to the fixed pulleys 13.

The pipe $a$, as has heretofore been stated, extends from the tank A to the purifier 2, which it enters at 0.20 meters above the entrance to the pipe 5. The mouth of this pipe, where it enters the purifier 2, is provided with any suitable spraying device, (see Fig. 9,) the object of which is to divide the milk into very fine drops, for the purpose hereinafter explained.

The heating-cylinder or pasteurizer consists of a vertical cylinder G, (Figs. 1 and 2 and seen in detail in Figs. 4 and 5,) say of 1.20 meters in diameter and three meters in height, and provided at the top with an adjustable cover. The cylinder G contains a coil of tinned copper pipe 15, which serves for pasteurizing by the aid of steam, with or without pressure. Steam, from a suitable source of supply, enters through the pipe 16 at or near the bottom of the cylinder, said pipe having a valve 17 for controlling the entrance of the steam.

Besides the steam-coil, the pasteurizer has a series of coils of thin copper pipe 18, one-half inch in interior diameter, which are placed in several series of concentric circles, as shown in Figs. 4 and 5. Here only two series are shown, but in practice there are 5. The series of coils are composed of sixteen different pipes wound spirally, and of a total length of eight hundred and fourteen meters, which hold or contain a volume of one hundred liters. These sixteen spiral pipes come together near the upper part of the pasteurizer (see Fig. 10) and open into the valve of the pipe 4, which leads from the purifier 2. The lower ends of these pipes come together in a similar manner and open into the pipe 19 near the bottom of the pasteurizer, which connects with the refrigerating apparatus. The object of dividing the milk, which enters through pipe 4 of two inches diameter, into so many smaller pipes of one-half inch diameter, is to cause the milk to circulate through the pasteurizer in thin streams, so that its heating may be rapid and uniform.

The refrigerator and storing-cylinder 20 (shown in Figs. 1, 2, and 6) consist of a tank built of brick, lined on the interior with any suitable material, and having a length of two meters, a width of 1.20 meters, and a height of 1.30 meters. Within this tank is the congealing apparatus 21 of an ice-machine and a storing-cylinder 22. The congealing apparatus has a pipe-coil of tinned copper, preferably formed of sixteen small spirally-arranged pipes, which diverge from the end of the tube 19 in a manner similar to that described with reference to the pasteurizer G. The tubes of this coil pass from the congealing apparatus 21 to form another coil, which encircles the storing-cylinder 22, and, converging at the bottom of the tank, are joined to a pipe 23, which enters the bottom of the storing-cylinder through an opening 24. The total length of the tubes in the two coils is eight hundred and forty meters, and their purpose is to produce the quick cooling of the milk.

The tank 20 is filled with salt water, as is usual in ice-machines, and kept in circulation by an agitator 25, the shaft of which passes out through the tank and is provided with a pulley 26, driven by a belt.

The storing-cylinder 22 consists of a cast-iron cylinder, open at the top, with an interior lining of bronze, and having an inside diameter of 1.30 meters and a height, above the bottom of the head, 2.80 meters. Its contents are about three thousand liters.

Within the storing-cylinder is a cast-iron piston 26, with bronze packing-rings, adjusted in such a way that it may be lifted by the pressure of the milk as it enters the said cylinder. A pipe 27 leads from the bottom of the cylinder outward through the tank to a second pipe 28, to which are attached two pumps 29. Pipes 30 lead from these pumps to the can-filling devices, now to be described.

The can-filling device is shown in Fig. 7, wherein 31 represents a frame mounted on truck-wheels, in which frame are placed the cans to be filled in vertical series of five cans, connected by small tubes one with the other. The pipe 32 on the bottom of the truck receives the milk through the pipe 30 from pumps 29. At each end of the pipe 32 is a valve 33, which serves to regulate the admission of the milk as it comes from the pumps 29, heretofore described. A steam-pipe 35, provided with a valve 34, enters the pipe 32 back of the valve 33. A number of short tubes 36 project from the upper surface of the pipe 32, which are connected by india-rubber tubing 37 with short tubes, one extending from the lower can of each series. From the upper can of each series a short tube projects, each of which connects by an india-rubber tube 39 with tubes depending from a pipe 38. A short section of glass tubing is introduced in the india-rubber tube for the purpose of ascertaining when the cans are full.

The cans are made of tin, circular in shape, sixteen centimeters in diameter, and forty-seven millimeters high, holding one thousand grams. This form presents four advantages: First, economy of manufacture. One sheet of tin, fourteen by twenty inches, will make two cans, leaving sufficient tin to bind the boxes, which contain a dozen cans. Secondly, the cans are filled with much greater rapidity. In the third place, sterilization is much more effectively and uniformly done; and, lastly, the diameter is so great in proportion to the height that the fat globules, &c., have less tendency to ascend than would be the case with a can of small relative diameter in proportion to its height.

The cans are united one with the other, in series of five in the direction of their diameters, by means of short tubes. The cans are placed on the track in skeleton frames until twenty frames of five cans each have been placed on each side of the car or truck, which thus holds two hundred cans.

The operation is as follows: Milk from the cow is poured into the upper part of the tank A upon the charcoal filter B, through which it passes to the bottom of the tank. Passing thus through the filter, the milk, which may contain many impurities, such as deleterious gases, dust, pus, hair, &c., is purified, the organic and other foreign bodies being removed, leaving only the gases. From the tank A the milk passes to the purifier 2, where it is deprived of the gases and rendered perfectly pure. At the beginning of the operation the piston 7 is at the bottom of the purifier 2. The valve $b$ in the pipe $a$ is closed, as is also the valve 6 in the connecting-pipe 5. Through the medium of a suitably-running belt on the pulley 13 the pinion $9^a$, connected to nut 9, is rotated in the proper direction to raise the piston to the top of the purifier, thus creating within the same a nearly perfect vacuum. At the same time that the piston in the purifier 2 is rising the piston in 1 is descending. The piston 7 having reached the top of the purifier 2, the valve $b$ is opened, and the atmospheric pressure will force the milk through the filter into the tank A, and from said tank through the secondary filter in the mouth of the rubber tube $a^2$ and tube $a$ into the purifier, passing through a meter $b'$, introduced in the pipe $a$. The outlet of the pipe $a$, as has been described, is provided with a spraying device, the purpose of which is to break up the milk into exceedingly-fine drops, which fall to the bottom of the purifier. This breaking up of the milk allows all gases to escape, which, being lighter than milk, will naturally rise to the top of the purifier. Were the milk introduced in a solid body the gases could not escape so readily and a portion would remain within the milk, defeating the object of my invention. The milk is allowed to enter the purifier until the meter $b'$ registers one hundred liters. The valve $b$ in the pipe $a$ is then closed and the valve 6 in the pipe 5 opened. The milk will then be on a level with the pipe 5, the gases being between the milk and the bottom of the piston. The mechanism is now reversed and the piston 7 forced downward. The piston in 1 at the same time rises. The downward movement of the piston 7 forces the gas through the pipe 5 into the cylinder 1, the piston of which is rising at this time; and, because of the vacuum created in said cylinder, the gas will pass into it with great rapidity. The piston 7 in the cylinder 2, continuing its downward movement and having expelled the gases, forces the milk through the pipe 4 at the bottom of cylinder 2 into the pasteurizer, the valve in said pipe having been previously opened. The milk, entering the pasteurizer through the pipe 4, is divided and enters the sixteen small tubes passing around the steam-coils, and becomes heated to a temperature of 100° centigrade. The coils in the pasteurizer hold one hundred liters, being of the same capacity as the purifier. The milk remains within the coils about seven or eight minutes, which is the time consumed in the operation of purification. Another body of one hundred liters of milk is prepared in the purifier 2 and forced upward into the pasteurizer. The milk in the pasteurizer is thus driven into the refrigerating apparatus, where it is cooled to a temperature of zero centigrade, from which it is forced into the refrigerator and storing-cylinder by another charge of milk, which, having been purified, is advanced by the descent of the piston in the vacuum-chamber.

It may be here stated that the piston 7 in the cylinder 2 is the only means used to move the milk from the filter to the storing-cylinder. Before entering the storing-cylinder the milk passes through a series of coils of small pipe which surround the same, and enters it through the pipe 23, where it remains until drawn off to be canned.

When a truck has been loaded to its full capacity, that is to say, two hundred cans, the rubber tubes 37 are connected with the small tubes projecting from the bottoms of the lower cans of the series, and the rubber tubes 39 connected with the small tubes at the tops of the series. Steam is them admitted through the pipe 35 by opening the valve 34, which, passing up through the cans, makes its exit through the pipe 38, provided with any well-known form of aspirator. This action is continued until the cans attain a certain degree of heat, after which the steam-valve 35 is closed and the milk-valve 33 opened. The pumps 29 are then operated, driving the milk from the storing-cylinder and forcing it through the pipes 30 into the pipe 32, from which it passes into the cans through the small pipes and connecting-tubes, hereinbefore described. The pumping is continued until the milk has filled all the cans and may be seen in the glass tube above them. All the tubes projecting from the tops of the cans are then closed, by pinching or otherwise, and the pumps again worked, so as to introduce more milk under pressure, after which the tubes at the bottom are closed. As soon as the cans are full the rubber tubes are taken off and the connecting-tubes between the cans are pinched tight, separated, and soldered. The cans of milk are then ready to be sterilized. By this process of filling, two hundred cans are filled in three minutes with six operators.

To sterilize the milk, the cans are placed on grids of iron in an anticlave apparatus, which is well known to all skilled in the art. There they are heated to a temperature of 113° centigrade for twenty minutes, or 118° centigrade for fifteen minutes, or 120° centigrade for ten minutes, this being sufficient to sterilize the milk. The cans are then taken out and placed in a receptacle containing water and an agitator to keep the water continually moving around them. Here they are left for, say, twenty-four hours, in order that the gases and substances separated by heating may again recombine. The milk so sterilized preserves its natural color and taste. There being no deleterious gases dissolved in the milk, nor air in contact with it, the oxidation of the casein and lactate is impossible, and the milk will, therefore, preserve its chemical composition. Nor will there be any precipitation of the phosphates, as the carbonates and bicarbonates are in their normal state, and the full quantity of carbonic acid is present. In the process of sterilization the carbonic acid is separated, but, by the rapid cooling, it recombines with the separated constituents, and again forms carbonates and bicarbonates.

A machine of this size will prepare ten thousand liters of milk daily.

Having thus described my invention, I claim—

1. In a process for preserving milk, first, removing from the milk, by filtration through a substance similar to charcoal, all foreign matters, organic and inorganic; secondly, extracting the air and gases by means of a vacuum; thirdly, quickly raising the temperature to 90° or 100° centigrade; fourthly, reducing the temperature quickly to zero centigrade; and, finally, introducing the milk by pressure, at a low temperature, into cans, substantially as set forth.

2. In a process for preserving milk, first, removing from the milk, by filtration through a substance similar to charcoal, all foreign matters, organic and inorganic; secondly, extracting the air and gases by means of a vacuum; thirdly, quickly raising the temperature to 90° or 100° centigrade for a short period; fourthly, reducing the temperature to zero centigrade; and, finally, introducing the milk by pressure, at a low temperature, into cans, all without exposure to the atmosphere, substantially as set forth.

3. The process for preserving milk, herein described, which consists in first, removing from the milk, by filtration through charcoal, all deleterious organic and inorganic matters; secondly, extracting the air and gases by means of a vacuum; thirdly, rapidly raising the temperature to 90° or 100° centigrade for a short time; fourthly, quickly lowering the temperature to zero centigrade; and, finally, introducing the milk into cans at the reduced temperature by pressure, all without exposure to the atmosphere, substantially as set forth.

4. In a process for preserving and sterilizing milk, first, purifying the same, by filtration through charcoal, and subjection to a vacuum; then, raising the temperature quickly for a short period to 90° or 100° centigrade; afterward reducing the temperature quickly to zero centigrade; then, filling the cans by pressure; and, finally, sterilizing the milk in the cans by heat and cold, all without exposing the milk to the atmosphere, substantially as set forth.

5. In a process for preserving and sterilizing milk, first, filtering the milk through a substance similar to charcoal, to remove all the deleterious organic matter and some of the gaseous substances; then, dividing the milk into very fine particles *in vacuo*, which separates the gases from the milk; then, quickly removing the gases from its surface to prevent reabsorption; then raising the temperature quickly to 90° or 100° centigrade for about eight minutes; next reducing the temperature quickly to zero centigrade; next forcing the milk under pressure into cans; and, finally, sterilizing it by raising the temperature to say 113° centigrade for about twenty minutes, and afterward reducing the temperature to zero centigrade for about twenty-four hours, all without exposing the milk to the atmosphere, substantially as set forth.

6. In an apparatus for preserving milk, the combination of a filter and a purifier for separating the milk from its impurities, a heating-cylinder connected thereto by suitable piping, and a refrigerating and storing apparatus connected to the heating apparatus for reducing the temperature of the heated, purified milk and storing it until wanted, substantially as set forth.

7. In an apparatus for preserving milk, the combination of a tank provided with a filter, a vacuum-cylinder into which the milk is forced from the tank by atmospheric pressure, a second vacuum-cylinder into which the gases pass from the first cylinder, a heating-cylinder or pasteurizer connected with the first cylinder by the pipe 4, a refrigerating and storing apparatus, connected with the pasteurizer by the pipe 19, and a pump or pumps for removing the milk from the storing-cylinder, substantially as set forth.

8. In an apparatus for preserving milk, the combination of a filter, a purifier, a pasteurizer, a refrigerator, a storing-cylinder, a pumping apparatus connected with the storing-cylinder and a pipe leading from the pumping apparatus to a can-filling device, substantially as set forth.

9. In an apparatus for preserving milk, a purifier consisting of a tank A, filter B, and a valved connecting-pipe a, in combination with vacuum-cylinders 1, 2, a valved connecting-pipe 5 between the cylinders, pistons 7 within the cylinders, and means for operating the pistons, substantially as set forth.

10. In an apparatus for preserving milk, the combination of two vacuum-cylinders, pistons within the cylinders, means for operating the pistons in opposite directions, a valved pipe connecting the cylinders, and a spraying device for the entering milk, above the valved connecting-pipe, substantially as shown and described.

11. In an apparatus for preserving milk, the combination, in a pipe or conductor for carrying the milk from the purifier to the storing-cylinder, of one or more sections of said pipe, subdivided into numerous smaller pipes, whose combined carrying capacity is equal to that of the said pipe or conveyer, a heating-cylinder containing a section of subdivided pipes, and a refrigerator containing another section of subdivided pipes, substantially as set forth.

12. In an apparatus for preserving milk, the combination in a pipe for conveying milk, of one or more sections subdivided into smaller pipes, coiled in two or more series, in which the carrying capacity of all the smaller pipes is equal to that of the carrying-pipe, a heating-cylinder containing one coil of pipes and a refrigerator containing a second coil of pipes, substantially as shown and described.

13. In an apparatus for preserving milk, the combination of two vacuum-cylinders, pistons within the cylinders, means for operating the pistons in opposite directions, a valved pipe between the cylinders for the escape of gas from one cylinder to the other, an inlet in one cylinder for the admission of milk, above the valved connecting-pipe, an outlet for milk at the bottom of the said cylinder, and an outlet at the bottom of the second cylinder for the escape of the gases, substantially as set forth.

In testimony whereof I hereunto set my hand and seal.

ENRIQUE TAULIS. [L. S.]

Witnesses:
C. E. M. MICHELS,
HUGH J. FINDLAY.